US012354070B2

(12) United States Patent
Palyutina et al.

(10) Patent No.: US 12,354,070 B2
(45) Date of Patent: Jul. 8, 2025

(54) MEDIA CONTENT CONTROL (71) Applicant: Nokia Technologies Oy, Espoo (FI)

(72) Inventors: Karina Palyutina, Cambridge (GB); Enrique Martin Lopez, Madrid (ES); Edward FitzGerald, Cambourne (GB); Troels F Roennow, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 938 days.

(21) Appl. No.: 17/278,169

(22) PCT Filed: Sep. 19, 2019

(86) PCT No.: PCT/FI2019/050670
§ 371 (c)(1),
(2) Date: Mar. 19, 2021

(87) PCT Pub. No.: WO2020/058577
PCT Pub. Date: Mar. 26, 2020

(65) Prior Publication Data
US 2021/0349967 A1 Nov. 11, 2021

(30) Foreign Application Priority Data
Sep. 21, 2018 (EP) .................... 18195902

(51) Int. Cl.
G06Q 20/12 (2012.01)
G06Q 20/40 (2012.01)
(Continued)

(52) U.S. Cl.
CPC ....... *G06Q 20/1235* (2013.01); *G06Q 20/401* (2013.01); *H04L 9/0822* (2013.01);
(Continued)

(58) Field of Classification Search
CPC .... G06F 21/10; G06F 21/109; G06F 21/1078; G06Q 20/1235; G06Q 20/401;
(Continued)

(56) References Cited

U.S. PATENT DOCUMENTS 7,236,455 B1 * 6/2007 Proudler ............... G06F 21/606
370/230
7,721,339 B2 5/2010 Madison et al.
(Continued)

FOREIGN PATENT DOCUMENTS

| CN | 101184086 A | 5/2008 |
| CN | 106791934 A | 5/2017 |

(Continued)

OTHER PUBLICATIONS

Benjamin Lipp, "A Mechanised Cryptographic Proof of the WireGuard Virtual Private Network Protocol," 2019, pp. 231-246. (Year: 2019).*

(Continued)

*Primary Examiner* — Luu T Pham
*Assistant Examiner* — Canh Le
(74) *Attorney, Agent, or Firm* — Laine IP Oy (57) ABSTRACT According to an example aspect of the present invention, there is provided a method, comprising: receiving a cryptographic proof of use indicative of decoding of a first media content element by a user device (400), receiving a cryptographic first expected proof of use value (410), and controlling access to an encrypted second media content element associated with the first media content element on the basis of verification of the received cryptographic proof of use and the first expected proof of use value (420).

10 Claims, 6 Drawing Sheets (51) Int. Cl.
 *H04L 9/08* (2006.01)
 *H04L 9/32* (2006.01)
 *G06F 21/10* (2013.01)

(52) U.S. Cl.
 CPC .......... *H04L 9/3247* (2013.01); *G06F 21/109* (2023.08); *H04L 2209/603* (2013.01)

(58) Field of Classification Search
 CPC ............... G06Q 20/065; G06Q 20/389; G06Q 30/0248; G06Q 30/0273; H04L 9/0822; H04L 9/3247; H04L 2209/603; H04L 9/3239; H04L 9/3297; H04L 9/50; H04N 21/2541; H04N 21/4405; H04N 21/4627; H04N 21/632; H04N 21/6581; H04N 21/835
 See application file for complete search history.

(56) References Cited

U.S. PATENT DOCUMENTS

| | | | |
|---|---|---|---|
| 11,164,165 B1* | 11/2021 | Andreev | G06Q 20/02 |
| 2005/0033700 A1 | 2/2005 | Vogler et al. | |
| 2009/0016507 A1 | 1/2009 | Altberg et al. | |
| 2009/0307757 A1 | 12/2009 | Groten | |
| 2010/0287580 A1 | 11/2010 | Harding et al. | |
| 2013/0104241 A1 | 4/2013 | Blom et al. | |
| 2013/0322628 A1 | 12/2013 | Rhyu et al. | |
| 2014/0298414 A1* | 10/2014 | Alsina | H04N 21/42204 726/3 |
| 2015/0172763 A1 | 6/2015 | Sidi | |
| 2015/0332395 A1* | 11/2015 | Walker | G06Q 20/3678 705/69 |
| 2017/0116693 A1 | 4/2017 | Rae et al. | |
| 2017/0178263 A1* | 6/2017 | Kraemer | G06Q 20/1235 |
| 2017/0206523 A1 | 7/2017 | Goeringer et al. | |
| 2017/0243216 A1 | 8/2017 | Kohn | |
| 2017/0249610 A1 | 8/2017 | Ferrer | |
| 2017/0277909 A1 | 9/2017 | Kraemer et al. | |
| 2017/0278100 A1* | 9/2017 | Kraemer | G06Q 20/3678 |
| 2017/0364552 A1 | 12/2017 | Pattanaik et al. | |
| 2018/0375668 A1* | 12/2018 | Diehl | H04L 9/3271 |
| 2019/0132652 A1* | 5/2019 | Zhao | H04N 21/8456 |
| 2020/0084483 A1* | 3/2020 | Brown | G06Q 20/405 |
| 2020/0184489 A1* | 6/2020 | Negi | G06Q 10/0832 |

FOREIGN PATENT DOCUMENTS

| | | |
|---|---|---|
| CN | 107211197 A | 9/2017 |
| EP | 2002549 A2 | 12/2008 |
| EP | 2587757 A1 | 5/2013 |
| WO | 2013/138475 A1 | 9/2013 |
| WO | 2017/194815 A1 | 11/2017 |

OTHER PUBLICATIONS

Shai Halevi, "A plausible approach to computer-aided cryptographics proofs," 2015, pp. 1-31. (Year: 2005).*

"Lightning Network : Scalable, Instant Bitcoin/Blockchain Transactions", Lightning Network, Retrieved on Feb. 8, 2021, Webpage available at : https://lightning.network/.

"Jboxcoin: a Decentralized Video Streaming Platform Set to Displace Youtube", Crypto Martez, Retrieved on Feb. 16, 2018, Webpage available at : https://www.cryptomartez.com/2017/10/jboxcoin-decentralized-video-streaming-platform.html.

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services Coding of moving video, Recommendation ITU-T H.265, Feb. 2018, 692 pages.

Extended European Search Report received for corresponding European Patent Application No. 18195902.4, dated Apr. 2, 2019, 8 pages.

International Search Report and Written Opinion received for corresponding Patent Cooperation Treaty Application No. PCT/FI2019/050670, dated Jan. 17, 2020, 17 pages.

"How Proof of View (PoV)™ Helps Creators", Verasity, Retrieved on Feb. 8, 2021, Webpage available at : https://medium.com/verasity/how-proof-of-view-pov-helps-creators-969a06c0da0e.

Habib et al: A Tree-Based Forward Digest Protocol to Verify Data Integrity in Distributed Media Streaming. IEEE Transactions on Knowledge and Data Engineering, Jul. 2005. vol. 17, No. 7, pp. 1010-1014.

* cited by examiner

MEDIA CONTENT CONTROL

RELATED APPLICATION

This application claims priority to PCT Application No. PCT/FI2019/050670, filed on Sep. 19, 2019, which claims priority to European Patent Application No. 18195902.4, filed on Sep. 21, 2018, each of which is incorporated herein by reference in its entirety.

FIELD

The present invention relates to media content control, and in particular to verifying use of media content.

BACKGROUND

Media content, such as images and videos, is increasingly shared and distributed via various services. Each platform, service or application typically has its own privacy control mechanism.

Content providers, such as video streaming service providers, typically aggregate content from a plurality of content creators, such as movie producers or providers. The content is delivered through a content delivery network (CDN), and a digital rights management (DRM) mechanism is applied, so that only the rightful final viewers can consume the content.

Currently, content providers supply their own trusted software, a client application that runs on the user's device and manages playback of the content. The client application may be a mobile device application or a set to box, for example. The playback management may be carried out at a variety of scales, from a simple decryption module running in a browser to a full native client application. In addition to such software performing DRM, it can also carry out other functions such as usage analytics and reporting.

SUMMARY

The invention is defined by the features of the independent claims. Some specific embodiments are defined in the dependent claims.

According to a first aspect, there is provided a method, comprising: detecting a decoded first media content element, generating a cryptographic proof of use associated with the first media content element on the basis of the decoded first media element, and providing the cryptographic proof of use for an access control function for controlling access to an encrypted second media content element associated with the first media content element on the basis of verification of the cryptographic proof of use and an expected first cryptographic proof of use associated with the first media content element.

According to a second aspect, there is provided a method, comprising: receiving a cryptographic proof of use indicative of decoding of a first media content element by a user device, receiving a cryptographic first expected proof of use value, and controlling access to an encrypted second media content element associated with the first media content element on the basis of verification of the received cryptographic proof of use and the first expected proof of use value.

According to a third aspect, there is provided an apparatus, comprising at least one processor, at least one memory including computer program code, the at least one memory and the computer program code being configured to, with the at least one processor, cause the apparatus at least to: detect a decoded first media content element, generate a cryptographic proof of use associated with the first media content element on the basis of the decoded first media content element, and provide the cryptographic proof of use for an access control function for controlling access to an encrypted second media content element associated with the first media content element on the basis of verification of the cryptographic proof of use and an expected first cryptographic proof of use associated with the first media content element.

According to a fourth aspect, there is provided an apparatus comprising at least one processor, at least one memory including computer program code, the at least one memory and the computer program code being configured to, with the at least one processor, cause the apparatus at least to: receive a cryptographic proof of use indicative of decoding of a first media content element by a user device, receive a cryptographic first expected proof of use value, and control access to an encrypted second media content element associated with the first media content element on the basis of verification of the received cryptographic proof of use and the first expected proof of use value.

According to a fifth aspect, there is provided a computer program (product) a computer readable medium, or a non-transitory computer readable medium comprising program instructions for causing an apparatus to perform at least the following: receive a cryptographic proof of use indicative of decoding of a first media content element by a user device, receive a cryptographic first expected proof of use value, and control access to an encrypted second media content element associated with the first media content element on the basis of verification of the received cryptographic proof of use and the first expected proof of use value.

According to a sixth aspect, there is provided a computer program (product), a computer readable medium, or a non-transitory computer readable medium comprising program instructions for causing an apparatus to perform at least the following: detect a decoded first media content element, generate a cryptographic proof of use associated with the first media content element on the basis of the decoded first media element, and provide the cryptographic proof of use for an access control function for controlling access to an encrypted second media content element associated with the first media content element on the basis of verification of the cryptographic proof of use and an expected first cryptographic proof of use associated with the first media content element.

In an embodiment according to any one of the aspects, the cryptographic proof of use is provided from the user device for verification against a first expected cryptographic proof of use associated with the first media content element from a first media content element provider.

In an embodiment according to any one of the aspects, the first media content provider is detected to be false or malicious in response to the cryptographic proof of use matching with the second expected proof of use value but not with the first expected proof of use value.

In an embodiment according to any one of the aspects, the cryptographic proof of use is provided to a trusted hardware module connectable or comprised by the apparatus.

In an embodiment according to any one of the aspects, the cryptographic proof of use is provided from a user device to a secure multiparty computation network.

In an embodiment according to any one of the aspects, a first signed digital resource transaction associated with the second media content element is sent from a first media content element provider to the access control function, and the first signed digital resource transaction is sent from the access control function to a media service provider or a second media content element provider for publication in a distributed ledger in response to the received cryptographic proof of use matching with the first expected proof of use value.

In an embodiment according to any one of the aspects, a second signed digital resource transaction associated with the second media content element is sent from the user device to the access control function, and the second signed digital resource transaction is sent from the access control function to the media service provider or the second media content element provider for publication in a distributed ledger in response to the received cryptographic proof of use not matching with the first expected proof of use value.

In an embodiment according to any one of the aspects, an input to the user device for proceeding with decoding of the first media content element is sent in response to verifying the first signed digital resource transaction and the second signed digital resource transaction.

In an embodiment according to any one of the aspects, the signed digital resource transaction is comprised in a blockchain transaction for publication in a blockchain network.

In an embodiment according to any one of the aspects, the cryptographic proof of use is generated on the basis of or comprises hashes of video frames of the first media content element decoded by a decoder.

EMBODIMENTS

Figure 1:
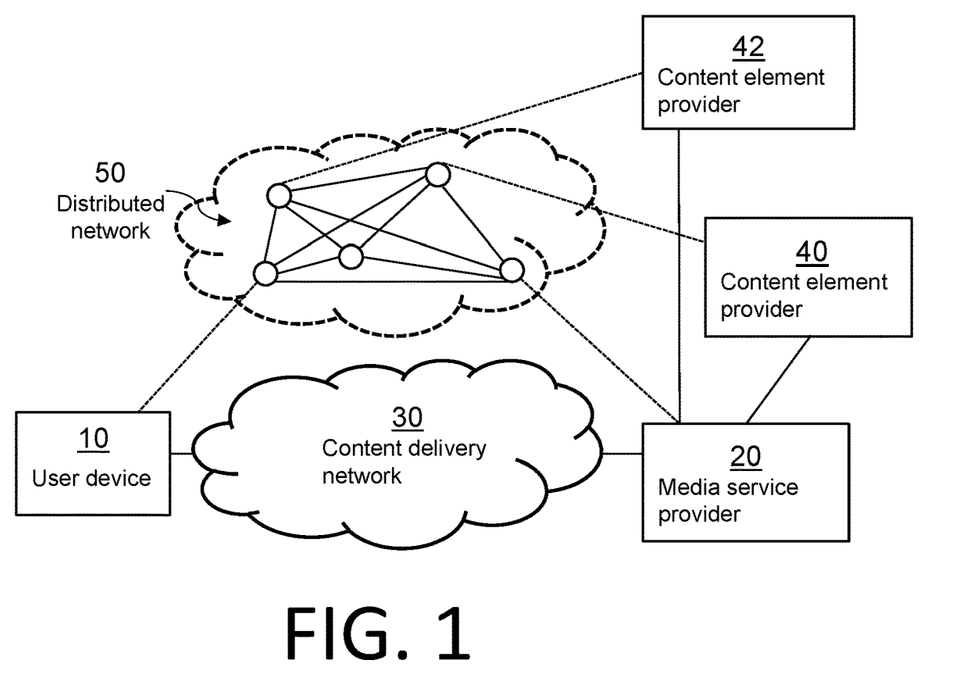
FIG. 1 illustrates an example system capable of supporting at least some embodiments of the present invention.

FIG. 1 illustrates an example system for media content provision system. A media service provider (MSP) 20 receives content from a plurality of content element providers (CEP) 40, 42. The CEP may refer generally to a media content owner device. The CEP may also or instead refer to a device of a content creator or source providing media content elements or parts for distribution. In some embodiments, the CEP provides video frames to be distributed to user devices 10 via a media content hosting or provision service by the MSP 20, such as a video on-demand streaming service. For example, the CEP may be a movie provider or an advertisement provider. The first CEP, CEP1 40 may provide a first media content element and the second CEP, CEP2, 42 a second media content element to the MSP for provision to user devices 10.

The media content may be provided from the MSP 20 to the user device 10 over a content delivery network (CDN) 30. The term user device refers generally to a device using the content, such as a mobile phone, pad, a wearable, or other type of mobile device for content playback, a desktop or laptop computer, a television, a set top box, game console, a theater device, a public display, or other type of digital media content player device. The CDN may comprise one or more wired and/or wireless networks, such as Ethernet-based network(s), cellular network(s), and/or wireless local area network(s).

The MSP 20 sends data packages over a transport protocol, such as the TCP. The content may be cached in the CDN 30. This can be in the form of dedicated networks or Internet service provider (ISP) based caches. Regardless of the exact nature, these caches can both reduce network latency as well as optimise bandwidth usage. When streaming content over the network, the original content is broken down into several small segments, such as in the range of 1 to 2 seconds of content. The MSP or CDN may also encode these segments at a series of different quality levels.

One or more of the user device 10, the MSP 20 and the CEP 40, 42 may be connected to a distributed network 50, such as a public or private blockchain-based network. The distributed network may comprise a number of nodes. The user device 10, the MSP 20 and/or the CEP 40, 42 may operate as a node of the network 50, or connect a node of the network 50 so that the latter operates on its behalf.

The system may comprise an administrator or management node, a hub, relay or other kind of intermediate device (not shown) for connecting a node to further networks or services, such as another distributed or centralized computing system or a cloud service. The nodes are mutually addressable in a suitable way, for example, they may be connected to an Internet protocol, IP, network. Messages released into the IP network with a recipient address are routed by the network to the recipient node identified by the recipient address.

There is need in some media content provision systems for confirming use of a media content element, for example that a video sequence has been used or played at a user device. A mere trust to a content provider and/or user application may not be adequate. There are now provided methods and apparatuses facilitating an improved media content element use control and proof of decoding the media content element in a user device by a cryptographic proof of use generated based on decoded media content element.

Figure 2:
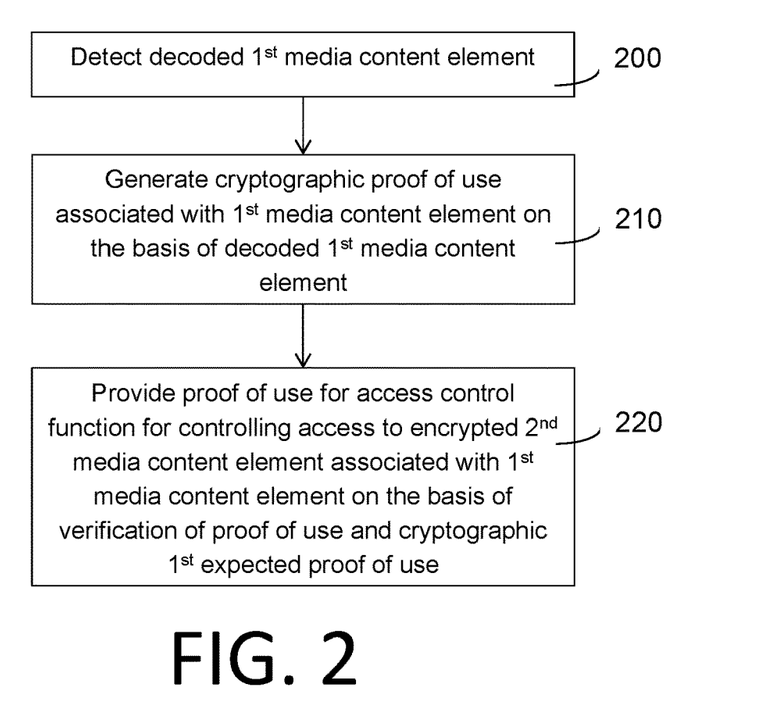
FIG. 2 illustrates a method in accordance with at least some embodiments.

FIG. 2 illustrates a method according to some embodiments. The method may be implemented in an apparatus configured to use, or consume or play media content, such as the user device 10.

A decoded first ($1^{st}$) media content element is detected 200. The media content element may be detected at or based on output of a media decoder configured to decode the $1^{st}$ media content element, for example.

A cryptographic proof of use associated with the $1^{st}$ media content element is generated 210 on the basis of the decoded $1^{st}$ media element. The cryptographic proof of use refers generally to a cryptographic proof or evidence that a media content element has been decoded. The proof of use thus may indicate that the media element has been provided to a (targeted) media content end user, or viewer in case of video content, in which case also the term proof of view may be applied.

The cryptographic proof of use, hereafter also referred to as CPOU for brevity, is provided 220 for an access control function for controlling access to an encrypted $2^{nd}$ media content element associated with the $1^{st}$ media content element. The association of the media content elements refers generally to a relation between the media content elements, in some embodiments that the $1^{st}$ media content element is identified or scheduled to be played before and as a pre-requisite required for the $2^{nd}$ media content element. Thus, the access control function (ACF) may be configured to verify the CPOU by comparing to an expected cryptographic proof of use (EPOU). In response to successful verification of CPOU, the ACF may allow access to the $2^{nd}$ media content element, and cause release of the $2^{nd}$ media content element and/or access credentials to the $2^{nd}$ media content element for the user device.

Figure 3:
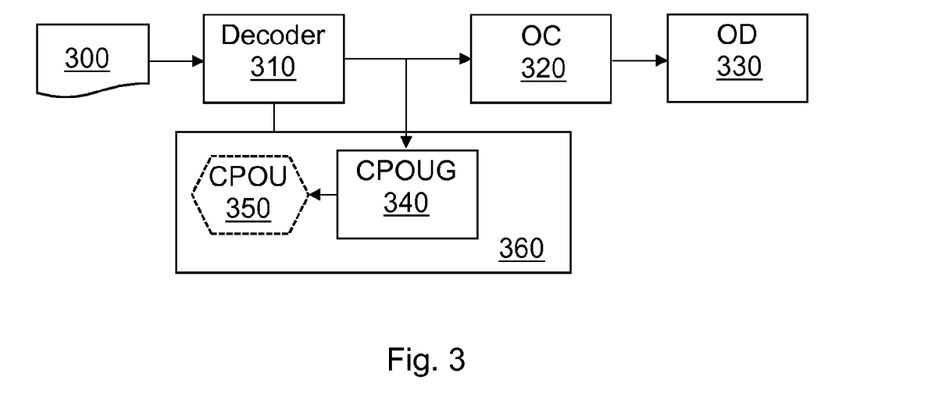
FIG. 3 illustrates modules of a user device in accordance with at least some embodiments.

FIG. 3 illustrates modules or units for a user device, such as the device 10, configured to generate 210 the CPOU. An input (encoded) media content element 300 is decoded by a decoder 310, such as a decoder configured to decode video based on H.263, H.264 or H.265 or another video coding standard, or another type of media decoder configured to decode the media content type of the element 300. The decoder 310 may implemented by electronic circuitry and/or software.

The decoded media content is provided to output circuitry (OC) 320, e.g. an HDMI circuitry, and to an output device (OD) 330, such as a display. A CPOU generator (CPOUG) 340 may be configured to receive 200 the decoded media content element and generate 210 the CPOU 350. The CPOUG 340 may be implemented by a controller 360 configured to perform also other functions related to media content control. In some embodiments, the CPOUG 340 is implemented by the decoder circuitry or software, such as ASIC and/or playback circuitry, and/or by a media player application or by a unit connected to a media player application of the user device 10.

In some embodiments, a decryption key for decrypting the encrypted second media content element from the access control function is received after block 220, upon the ACF verifying the CPOU to match the EPOU. The received decryption key may be provided to the decoder 310 for decrypting the encrypted second media content element. Thus, the controller 360 may receive the decryption key and send it to the decoder 310 or configure the decoder to apply the decryption key.

Figure 4:
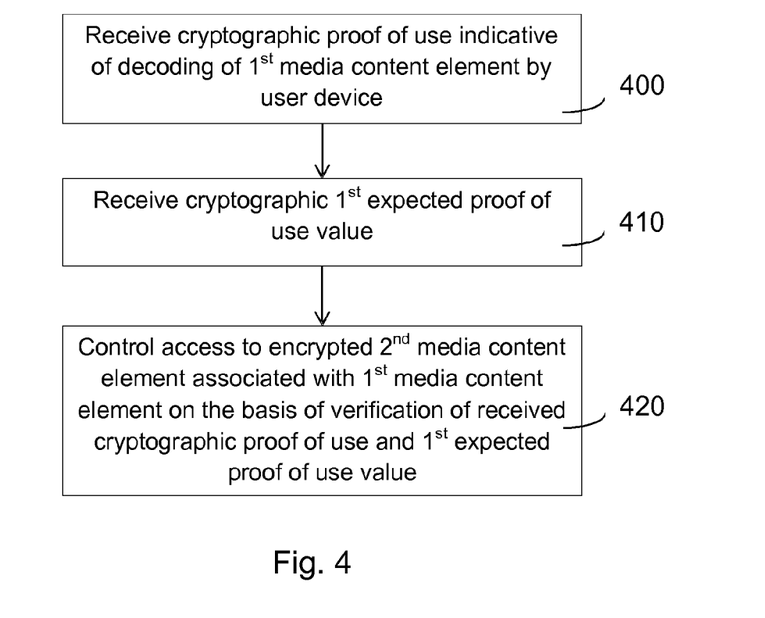
FIGS. 4 to 7 illustrate methods in accordance with at least some embodiments.

FIG. 4 illustrates a method according to some embodiments. The method may be implemented in an apparatus configured to control use or playback of media content elements, and carry out the ACF. For example, the apparatus may be a rights controller apparatus, a user device, or a service provider device. It is to be noted that in some embodiments the ACF is provided by multiple parties, in a distributed network, so a device participating in the multi-party computation may be configured to carry out a portion of the complete computation task to arrive at final access control resolution.

A CPOU indicative of decoding of a $1^{st}$ media content element by a user device is received 400, for example sent 220 by the user device 10. A cryptographic first expected proof of use value associated with the first media content element, herein referred to as EPOU1, is received 410. The EPOU1 may be received from the CEP1 40, for example. It is to be noted that the EPOU1 may be received before the CPOU.

Access to an encrypted second media content element associated with the $1^{st}$ media content element is controlled 420 on the basis of verification of the received CPOU and the EPOU1.

Thus, depending on the result of the verification procedure, access to the $2^{nd}$ media content element is allowed or rejected. In some embodiments, the verification comprises checking if the CPOU and EPOU1 match. If the CPOU matches the EPOU1, the decryption key for decrypting the encrypted second media content element may be sent in or after block 420. Otherwise, the access may be rejected.

The verification of 420 may involve comparison to a further expected proof of use EPOU2, which may be received from the MSP 20 or the CEP2 providing the $2^{nd}$ media content element (and the decryption key thereof). If the CPOU matches the EPOU1 and the EPOU2, the access the $2^{nd}$ media content element may be allowed and the decryption key for decrypting the encrypted second media content element may be sent in or after block 420. If the CPOU does not match with the EPOU1, but the EPOU1 matches with the EPOU2, the decryption key may be sent for the user device, if the user device has provided a valid signed digital resource transaction (as illustrated further below). Depending on the applied access control policy, similarly, if the CPOU and EPOU1 do not match, but CPOU matches with the EPOU2, access may be allowed, given that a valid signed digital resource transaction has been obtained from the provider of the CEP1 (or the user device). If the verification of both the CPOU and EPOU1 fails, the overall access control procedure or protocol may be interrupted, whereby access to the $2^{nd}$ content element is not allowed and the decryption key is not provided to the user device. However, it is to be noted that in an alternative embodiment already indicated, the CPOU is merely compared to the EPOU1 and access is enabled if there is a match.

Figure 5:
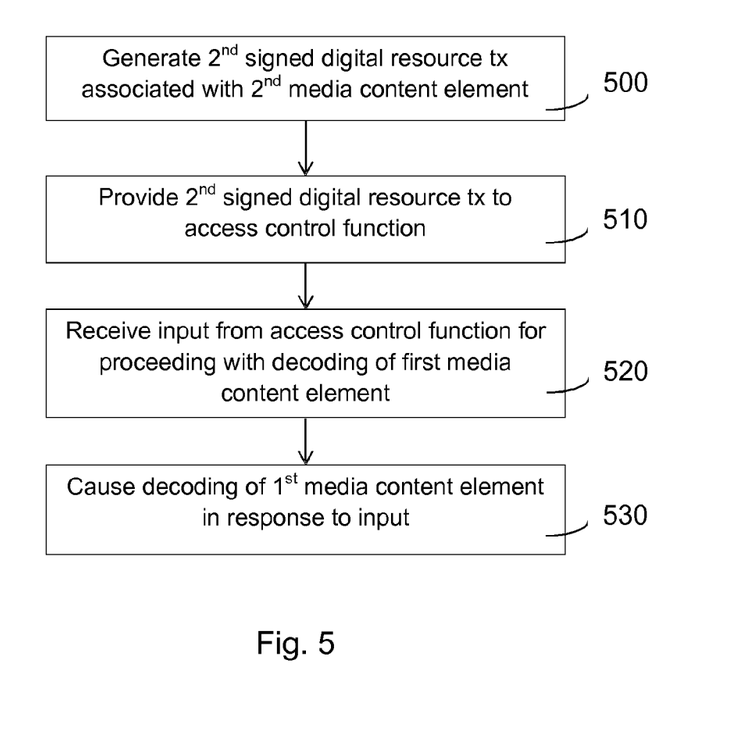

FIG. 5 illustrates a method according to some embodiments. The method may be implemented in an apparatus configured to carry out the method of FIG. 2, such as the user device 10 and the controller 360 thereof.

A second signed digital resource transaction, herein referred as TX2, associated with the second media content element, is generated 500. Thus, the user device may provide the TX2 for providing a fallback, or secondary digital resource transaction for allowing the user device to access the second content element in case a valid digital resource transaction for this purpose, herein referred to as the first signed digital resource transaction, TX1, is not received from the CEP1. Depending on the implementation, the TX2 may be addressed to the CEP2, or to the MSP if the MSP is acting as an entity in the DRM process and providing the $2^{nd}$ content element of or on behalf of the CEP2. The TX2 may comprise an identifier of the $2^{nd}$ content element and define a cryptocurrency transaction from the user device to the CEP2 or MSP, for example. In some embodiments, the transactions TX1 and TX2 are signed by a secret key available in CEP1 and the user device 10, respectively. The signature may be verified based on a public key of the respective entity.

The TX2 is provided 510 for the ACF. Similarly as for provision 220 of the CPOU, the provision of the TX2 to the ACF may refer to sending the TX2 to the ACF locally in the same apparatus or to further apparatus(es) over communication network(s).

An input is received 520 from the ACF for proceeding with decoding of the first media content element after verification of the TX2 by the ACF. In response to the input, decoding of the first media content element in response to the input is caused 530. Thus, the controller 360 may send an appropriate control signal triggering the decoding to the decoder 310, for example. The controller may also activate the CPOUG 340 for detecting decoded $1^{st}$ media content element portions (by entering the method of FIG. 2 and block 200).

Figure 6:
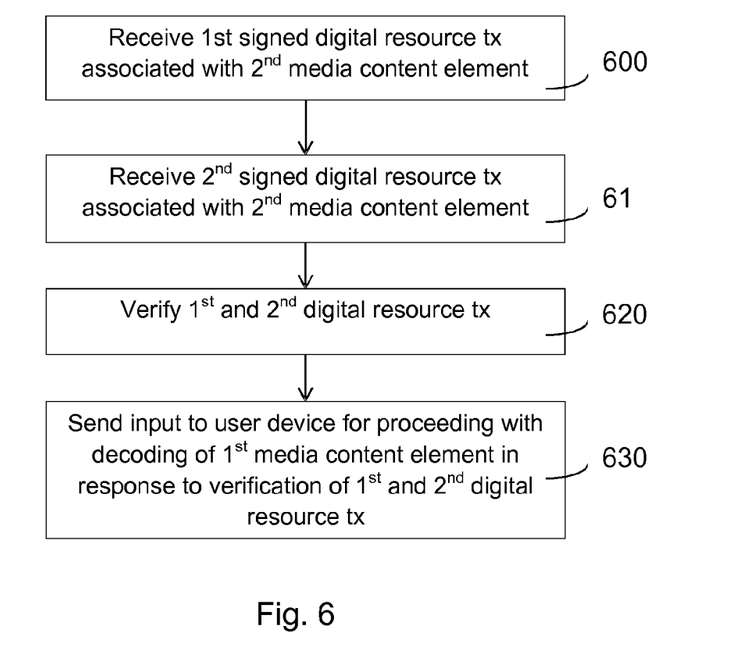
Figure 7:
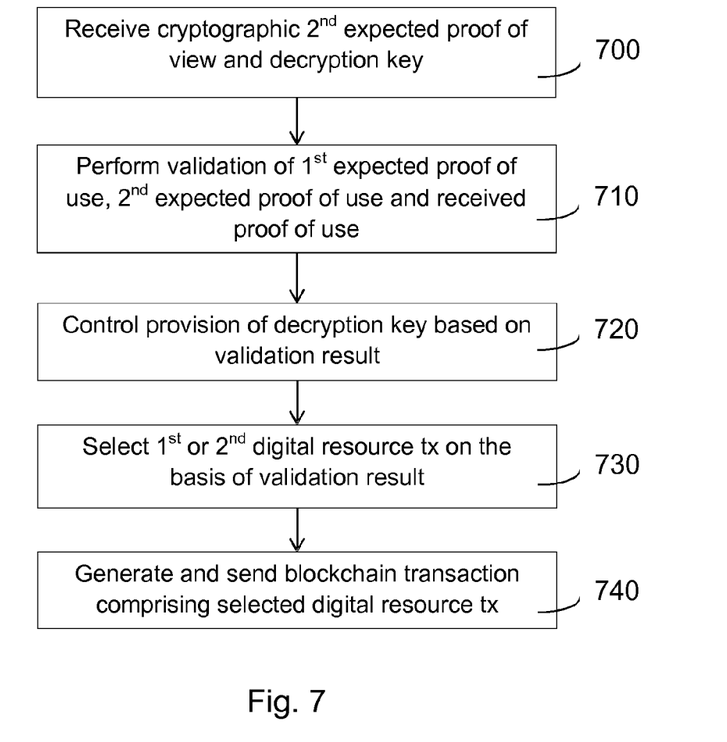

FIGS. 6 and 7 illustrate methods according to some embodiments. The methods may be implemented in an apparatus configured to control use or playback of media content elements, and carry out the ACF according to FIG. 4. For example, the apparatus may be a rights controller apparatus, a user device, or a service provider device. It is to be noted that in some embodiments the ACF is provided by multiple parties, in an embodiment in a distributed network 50, so a device participating in the multi-party computation may be configured to carry out a portion of the complete computation task to arrive at final access control resolution.

In FIG. 6, a TX1 associated with the $2^{nd}$ media content element is received 600 from the CEP1, such as the CEP1 40. A TX2 associated with the $2^{nd}$ media content element is received 610 from the user device. For example, the controller 360 may send the TX2 in block 510. It is to be noted that the TX2 may be received before the TX1.

The TX1 and TX2 are verified 620. An input is provided 630 by the ACF for proceeding with decoding of the $1^{st}$ media content element in response to verifying both the TX1 and the TX2. This may involve sending such input message to the user device 10 or otherwise providing the input for block 520. In case the verification fails, the procedure may be interrupted.

The blocks of FIGS. 5 and 6 may be part of a first DRM stage or round carried out before entering a second DRM stage illustrated in connection with FIGS. 2, 4 and 7. The input 630, 520 may indicate e.g. continuation of the DRM procedure and desired service for the user device based on provision of the $2^{nd}$ media content element for the user on the condition that the $1^{st}$ media content element is decoded for UI output.

FIG. 7 illustrates an embodiment applying the two expected use of values. A cryptographic second expected proof of use value, EPOU2, and a decryption key for decrypting the encrypted $2^{nd}$ media content element are received 700 from the CEP2, such as the CEP 42, or in some embodiments the MSP 20. Block 700 may be an additional block for the method of FIG. 4, entered before or after block 400 or 410. Block 710 may be carried out in connection with and before block 420 and comprises performing 710 validation stage of the EPOU1, the EPOU2, and the CPOU. Hence, at least either of the CPOU and EPOU1 needs to be successfully verified against the EPOU2. If not, the validation stage 710 fails and the procedure may be interrupted.

On the basis of validation result of block 710, provision of the decryption key for the user device for decrypting the $2^{nd}$ media content element is controlled 720. This may involve the features already illustrated in connection with block 420.

In response to the CPOU matching with the CPOU2 but not with the CPOU1, the ACF may detect that the CEP1 is false or malicious.

The TX1 or TX2 is selected 730 on the basis of validation result of block 710. A transaction comprising the selected TX1 or TX2 is generated 740 and provided for a distributed ledger.

Thus, in response to the CPOU matching with (at least) the EPOU1, the TX1 may be sent in 740 to the CEP2 or MSP, or directly to the distributed network 50 for publication in the distributed ledger. In response to the CPOU not matching with the EPOU1, the TX2 may be sent to the CEP2 for publication in the distributed ledger.

The purpose of the distributed ledger is to record and enforce verifiable transactions and order of events, in the present embodiments related to the digital resource transactions associated with and generated on the basis of the media content access control procedure. A distributed ledger can be considered a general database synchronized between many parties, which, at successive time instances, comprises successive states of consensus about a particular matter, e.g., on device quote or update event. Such states may be reached by many parties, e.g., nodes in a peer-to-peer (P2P) network, following a decentralized consensus algorithm. This may provide an agreement between the nodes without assuming trust between them. In some embodiments, as indicated in 740, the transaction is a blockchain transaction for publication in a blockchain network. It is to be noted that it is not necessary to apply the two transactions TX1, TX2, but the system may be implemented or used based on the TX1 only.

Figure 8:
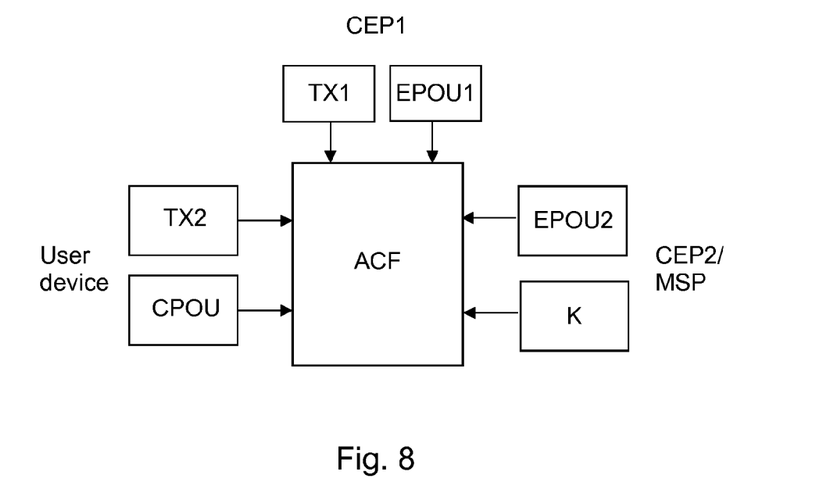
FIG. 8 illustrates inputs to an access control function in accordance with at least some embodiments.

FIG. 8 summarizes inputs to the ACF according to embodiments applying the two expected proof of use values. K refers to the decryption key.

The present features facilitate to obtain cryptographic evidence of decoding of a first media content element, such as an advertisement, by the CEP1 40, thus enabling to reliably confirm that the media content element has been 'consumed' by the user device. The present features also facilitate to control access to the second media content element, such as a movie, by the CEP2 42 or the MSP 20 in response to the verification of the proof of use evidence received from the user device. Automatic malicious party detection and reward system is enabled by the above illustrated use of digital resource transaction and proof of uses.

It is to be noted that various additions and amendments may be applied to at least part of the above illustrated features. For example, the input 520, 630, for proceeding with the decoding of the $1^{st}$ media content element may be separate from the TX1 and/TX2 verification (the failing of which prevents access to the $2^{nd}$ media content element). In another embodiment, the decoding of the $1^{st}$ media content element may be performed without specific input from the ACF, whereby the process is interrupted in response to failing to validate the transactions TX1 and TX2, or the proof of use validation 710 failing. Some further example embodiments are illustrated below. As a further example, verification and access control may be separate blocks in FIG. 4.

Figure 9:
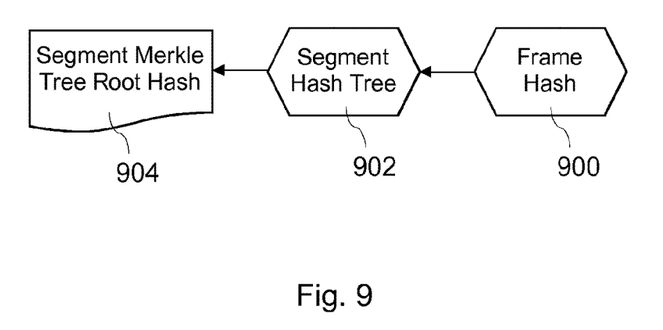
FIG. 9 illustrates a cryptographic proof of use in accordance with at least some embodiments.

In some embodiments, the CPOU is generated on the basis of or comprises hashes of video frames of the first media content element decoded by the decoder 310. With reference to the example embodiment of FIG. 9, hash, referred to as Frame Hash 900 is calculated for each video frame (of an input video segment) generated from the decoder. A combined hash 902 may then be generated from all frame hashes generated from the video segment. In one embodiment a root hash 904 of a Merkle tree may be formed for the segment based on the frame hashes of the segment. The Merkle tree structure is useful to efficiently identify any mismatch in the video frames. To compare two segments, one would only need to look at the root. If the root hashes match, it is extremely likely that the segments are identical. Furthermore, the tree structure allows locating the individual image frames that produce the mismatch in logarithmic time.

In some embodiments, the CPOU is provided in block 220 to a trusted hardware module, connectable or comprised by the user device, and configured to implement at least partially the ACF. Hence, the user device may be configured to carry out also at least some of the features illustrated in connection with FIGS. 4, 6 and 7. For example, software guard extensions (SGX) may be applied for providing the trusted hardware module.

Thus, the user device 10, the MSP 20 (or CEP2), and the CEP1 40 may be configured to send their secret inputs (as i.a. illustrated in connection with FIG. 8) to the trusted hardware module which acts as trusted party and is configured to return secret outputs to each corresponding party. Secrecy of the inputs and outputs can be achieved using encryption, such as asymmetric encryption, and trust in the code running in the hardware may be achieved via attestation.

Below, an example process is illustrated with reference to FIG. 10, a user device as a final viewer of streamable media content associated with an advertisement (ad), an SGX server operating as the ASF, an advertisement provider as the CEP1 and content provider as the MSP 20 (or CEP2).

The content provider may distribute encrypted media content (which may be considered as or to comprise the $2^{nd}$ content element) for a content delivery network (CDN) which sends the encrypted media content to the user device upon a media streaming request from the user device. The user device sends a "fallback" signed transaction (TX2) for the content. The Ad provider prepares a signed transaction (TX1) for the content provider for compensating for the content upon viewing an associated ad (the $1^{st}$ media content element). These two signed transactions are sent to the trusted hardware in a first round of inputs, together with the public key of the content provider. The public key of the content provider is assumed to be already known to ad provider and the user device that used it for preparing the signed transactions. The trusted hardware sends a message indicating "Proceed" to the three parties if the transactions are valid, or "Fail" otherwise, which interrupts the protocol.

If Proceed is returned, the final viewer watches the ad, and the three parties start the second round of secret inputs, which are sent to the trusted hardware. As part of the second round, the three parties submit their "fingerprints", either proof of view (CPOU) or expected proofs of view EPOU1, EPOU2, for validation. The content provider also submits the decryption key.
  a. If the proof of view matches between the user device and the content provider, then the system can detect the presence of a malicious ad provider.
  b. If the proof of view matches between the ad provider and content provider, then the system can prove that the user is acting maliciously (either by design or by not watching the ad).
  c. The content provider has no incentive to act maliciously in this system because they are the party receiving the reward.
  d. This stage is considered to be successful when the proof of view of the content provider matches the proof of view from the user or the ad provider or both. Otherwise, the protocol is interrupted.

The trusted hardware verifies if the expected proof of view from the ad provider (EPOU1) equals the proof of view from the user device (CPOU).
  If successful:
    The user device receives the decryption key for the content, and the content can be consumed
    The content provider receives transaction signed by the ad provider (TX1). The content provider can then broadcast the transaction to an associated distributed network, such as a corresponding cryptocurrency network.
  If failure
    If the proof of view validation stage was successful, with the proof of view from the user device being false, the content provider receives the transaction signed by the user device (TX2). The content provider can then broadcast the transaction to the cryptocurrency network.
    If the proof of view validation stage was successful, with the expected proof from the ad provider being false, the content provider may receive the transaction signed by the ad provider. The content provider can then broadcast the transaction to the cryptocurrency network.

In some embodiments, at least some of the ASF functions are carried out by multiparty computation. Thus, the CPOU is sent in or after block 220 to at least one secure multiparty computation (SMPC) node configured to verify the CPOU. The user device 10, the MSP 20/CEP 42, and the CEP1 may engage in an SMPC protocol. However, it will be appreciated that instead of or in addition to these parties, other entities may be involved in the SMPC. The SMPC protocol guarantees the secrecy of the inputs and allows the participating entities to compute a common output.

Figure 10:
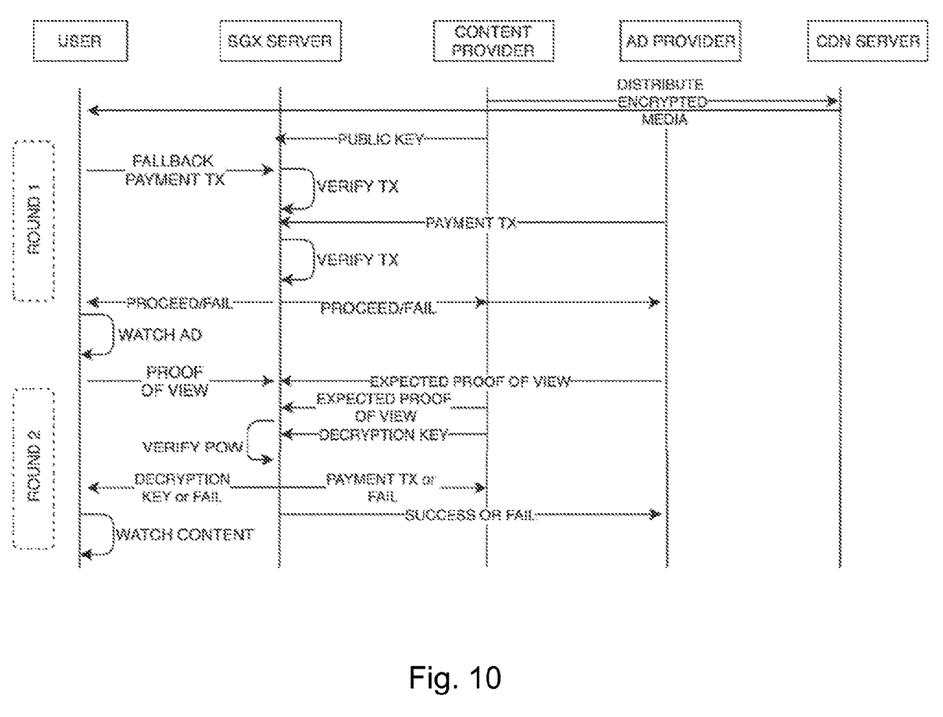
FIG. 10 illustrates a signalling example in accordance with at least some embodiments.

The procedure may be otherwise similar to the procedure illustrated above, e.g. in connection with the example of FIG. 10, but the decryption key for the second media content element is sent to the user device in encrypted form. For example, the decryption key may be ciphered based on a random secret key shared by the user device and the content provider 30. The user device may send the random secret key e.g. during the second stage of the DRM procedure in connection with the CPOU. Upon the CPOU matching with the EPOU1, an XOR operation with the random secret key may be performed to the decryption key, and the user device XORs the received encrypted decryption key.

There may be a further procedure or phase for verifying the media content, such as the $2^{nd}$ media content element by the MSP/CEP2. The release of the TX1 or TX2 740 may be triggered only after successful verification of the decrypted media content element, e.g. by the user device. For example, this may arranged by using checksums. This enables to detect malicious content providers providing incurred decryption key.

As indicated above, in some embodiments, a distributed database, such as a blockchain-based database, is applied at least for the digital resource transactions. The distributed network 50 may be a blockchain network and the nodes operate as blockchain (BC) nodes and store local blockchain database. The distributed ledger is a blockchain ledger and the transaction is provided to the blockchain ledger in response to validation of a blockchain transaction comprising the TX1 or TX2. Application of blockchain technology and the ledger enable a way to track the unique history of transactions by the individual nodes in the network.

Blockchain state information shared by the nodes may store all the transactions and history carried out in the network 50, also regarding the privacy control information of media vector components. The blockchain state information is stored in or as the blockchain ledger. Each node may comprise the ledger whose content is in sync with other ledgers. Each node may have their own copy of the ledger which is in some embodiments permission-controlled, so participants see only appropriate transactions. Blockchain transactions secured by strong cryptography are exchanged and validated in order to reach consensus for resource ownership. Information provided in a blockchain transaction may be stored in the blockchain ledger in response to validation of the respective blockchain transaction.

A blockchain transaction may comprise an identifier of a new owner, that is the recipient, of the resource, together with a cryptographic signature of the previous owner, that is the sender, such that malicious attackers cannot re-assign resources they do not own. A blockchain transaction, comprising the first or second transaction, may be a public transaction. The blockchain transaction record comprises the relevant transaction information, e.g. regarding the reward in a cryptocurrency system by the advertiser/CEP1 to the MSP 20, and a hash pointer to previous block of the chain. The record may comprise also further information element(s), such as timestamp.

The ACF may be configured to provide signed blockchain transactions to the blockchain ledger directly or via other units, such as the MSP. To establish a next block, the transactions are broadcast into the blockchain network. Broadcasting here refers to a dissemination method suitable for the context, which will cause the transactions to be communicated to the nodes of the network in general. Reaching each and every node with each and every transaction is not strictly necessary.

A node establishing the next block may be known as a miner node. A miner node may compile a set of transactions, which it receives from the broadcasts, for the next block, and search for a proof-of-work code that covers all the transactions in the set of transactions for the next block. For example, the proof-of-work code may be a numerical value, with which the contents of the next block, that is, the set of transactions, hashes to a value that is less than a threshold. Once a miner discovers the proof-of-work, it can publish the block, which other nodes of the system will then add to the block chain as the new most recent established block.

In case the miner node discovers a proof-or-work based on an incomplete set of transactions, for example if some transactions did not reach the miner node, other nodes in the network will not accept the block into the blockchain, and it will be excluded from a consensus version of the blockchain in the system.

Although discussed above in terms of proof-of-work, in some embodiments a proof-of-stake may be used instead of, or additionally to, a proof-of-work. In a proof-of-stake based system, a new block may be accepted once a predetermined fraction of resources are proven as owned by nodes ready to accept the new block version.

An electronic device comprising electronic circuitries may be an apparatus for realizing at least some embodiments. The apparatus may be or may be comprised in a computer, a laptop, a tablet computer, a cellular phone, a machine to machine (M2M) device, a wearable device, an access network device, a network management or control device, a server, or any other appropriately configured apparatus provided with communication capability. In some embodiments, the apparatus carrying out at least some of the above-described functionalities is comprised in such a device, e.g. the apparatus may comprise circuitry, such as a chip, a chipset, a microcontroller, or a combination of circuitries for or in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 11:
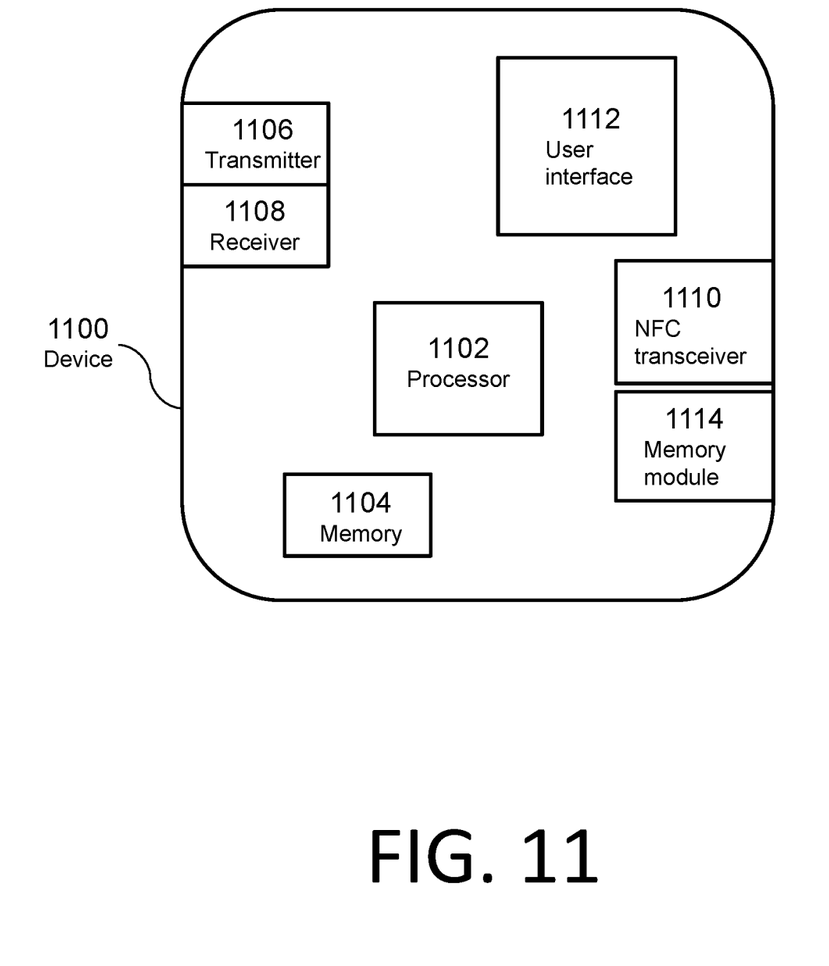
FIG. 11 illustrates an apparatus in accordance with at least some embodiments.

FIG. 11 illustrates an example apparatus capable of supporting at least some embodiments of the present invention. Illustrated is a device 1100, which may comprise a communications device arranged to operate as an entity in the presently disclosed system related to media content access control. The device may be arranged to carry out at least some of the embodiments related to generating, validating, and/or using the proof of use and digital resource transactions related to the above-illustrated media content access control features and procedure. The device may include one or more controllers configured to carry out operations in accordance with at least some of the embodiments illustrated above, such as some or more of the blocks illustrated above in connection with FIGS. 2 to 10. The device may operate as the user device 10 and/or the apparatus comprising (or e.g. as a SMPC node contributing to the implementation of) the ASF, for example.

Comprised in the device 1100 is a processor 1102, which may comprise, for example, a single- or multi-core processor wherein a single-core processor comprises one processing core and a multi-core processor comprises more than one processing core. The processor 1102 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 1100 may comprise memory 1104. The memory may comprise random-access memory and/or permanent memory. The memory may comprise at least one RAM chip. The memory may comprise solid-state, magnetic, optical and/or holographic memory, for example. The memory may be at least in part accessible to the processor 1102. The memory may be at least in part comprised in the processor 1102. The memory 1104 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 1100 but accessible to the device. For example, control parameters affecting operations related to the generation, validation, and/or application of the proof of work values and/or and digital resource transactions may be stored in one or more portions of the memory and used to control operation of the apparatus. Further, the memory may comprise device-specific cryptographic information, such as secret and public key of the device 1100.

The device 1100 may comprise a transmitter 1106. The device may comprise a receiver 1108. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, wireless local area network, WLAN, and/or Ethernet standards, for example. The device 1100 may comprise a near-field communication, NFC, transceiver 1110. The NFC transceiver may support at least one NFC technology, such as NFC, Bluetooth, Wibree or similar technologies.

The device 1100 may comprise user interface, UI, 1112. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 1104 or on a cloud accessible via the transmitter 1106 and the receiver 1108, or via the NFC transceiver 1110, and/or to play games.

The device 1100 may comprise or be arranged to accept a user identity module or other type of memory module 1114. The user identity module may comprise, for example, a subscriber identity module, SIM, and/or a personal identification IC card installable in the device 1100. The user identity module 1114 may comprise information identifying a subscription of a user of device 1100. The user identity module 1114 may comprise cryptographic information usable to verify the identity of a user of device 1100 and/or to facilitate encryption and decryption of communication effected via the device 1100, such as the private and/or public keys as illustrated above.

The processor 1102 may be furnished with a transmitter arranged to output information from the processor, via electrical leads internal to the device 1100, to other devices comprised in the device. Such a transmitter may comprise a serial bus transmitter arranged to, for example, output information via at least one electrical lead to memory 1104 for storage therein. Alternatively to a serial bus, the transmitter may comprise a parallel bus transmitter. Likewise the processor may comprise a receiver arranged to receive information in the processor, via electrical leads internal to the device 1100, from other devices comprised in the device 1100. Such a receiver may comprise a serial bus receiver arranged to, for example, receive information via at least one electrical lead from the receiver 1108 for processing in the processor. Alternatively to a serial bus, the receiver may comprise a parallel bus receiver.

The device 1100 may comprise further devices not illustrated in FIG. 11. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 1110 and/or the user identity module 1114.

The processor 1102, the memory 1104, the transmitter 1106, the receiver 1108, the NFC transceiver 1110, the UI 1112 and/or the user identity module 1114 may be interconnected by electrical leads internal to the device 1100 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. The skilled person will appreciate that above-illustrated embodiments may be combined in various ways. Embodiments illustrated in connection with FIGS. 2 to 10 may be taken in isolation or further combined together.

Various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communications.

ACRONYMS LIST

| | |
|---|---|
| ASIC | Application-specific integrated circuit |
| CDN | Content delivery network |
| DRM | Digital rights management |
| FPGA | Field-programmable gate array |
| GSM | Global system for mobile communication |
| IC | Integrated Circuit |
| LTE | Long term evolution |
| MPC | Multiparty computation |
| NFC | Near-field communication |
| PoS | Proof-of-stake |
| PoW | Proof-of-work |
| SMPC | Secure multiparty computation |
| SGX | Software guard extensions |
| UI | User interface |
| WCDMA | Wideband code division multiple access, |
| WiMAX | Worldwide interoperability for microwave access |
| WLAN | Wireless local area network |

The invention claimed is:

1. An apparatus comprising at least one processor; and at least one memory including computer program code for one or more programs,
the at least one memory and the computer program code configured to, with the at least one processor, cause the apparatus to perform at least the following:
generate a signed digital resource transaction associated with an encrypted second media content element,
provide the signed digital resource transaction to an access control function,
receive an input from the access control function for proceeding with decoding of a first media content element after verification of the signed digital resource transaction, and
cause decoding of the first media content element in response to the input,
detect a decoded first media content element in response to the decoding,
generate a cryptographic proof of use associated with the first media content element on the basis of the decoded first media element, and
provide the cryptographic proof of use for the access control function for controlling access to the encrypted second media content element associated with the first media content element on the basis of verification of the cryptographic proof of use and an expected first cryptographic proof of use associated with the first media content element,
wherein the memory and computer program code are further configured to, with the processor, cause the apparatus to generate the cryptographic proof of use on the basis of hashes of video frames of the decoded first media content element.

2. The apparatus of claim 1, wherein the memory and computer program code are further configured to, with the processor, cause the apparatus to receive a decryption key for decrypting the encrypted second media content element from the access control function upon successful verification of the cryptographic proof of use, and provide the decryption key to a decoder for decrypting the encrypted second media content element.

3. The apparatus of claim 1, wherein the memory and computer program code are further configured to, with the processor, cause the apparatus to provide the cryptographic proof of use to a trusted hardware module connectable or comprised by the apparatus.

4. The apparatus of claim 1, wherein the memory and computer program code are further configured to, with the processor, cause the apparatus to send the cryptographic proof of use to at least one secure multiparty computation node configured to at least verify the cryptographic proof of use.

5. The apparatus of claim 1, wherein a second signed digital resource transaction is for publication in a distributed ledger in response to the received cryptographic proof of use not matching with the first expected proof of use value.

6. The apparatus of claim 1, wherein the signed digital resource transaction is comprised in a blockchain transaction for publication in a blockchain network.

7. The apparatus of claim 1, wherein the input is sent from an access control device in response to verifying the provided signed digital resource transaction and another signed digital transaction associated with the second media content element and received by the access control function from a first media content element provider, and the another signed digital resource transaction is sent from the access control function to a media service provider or a second media content element provider for publication in a distributed ledger in response to the received cryptographic proof of use matching with the first expected proof of use value.

8. A computer-implemented method, comprising:
generating a signed digital resource transaction associated with an encrypted second media content element,
providing the signed digital resource transaction to an access control function,
receiving an input from the access control function for proceeding with decoding of a first media content element after verification of the signed digital resource transaction, and
causing decoding of the first media content element in response to the input,
detecting a decoded first media content element in response to the decoding,
generating a cryptographic proof of use associated with the first media content element on the basis of the decoded first media element, and
providing the cryptographic proof of use for the access control function for controlling access to the encrypted second media content element associated with the first media content element on the basis of verification of the cryptographic proof of use and an expected first cryptographic proof of use associated with the first media content element,
wherein the method further comprises generating the cryptographic proof of use on the basis of hashes of video frames of the decoded first media content element.

9. The method of claim 8, further comprising: receiving a decryption key for decrypting the encrypted second media content element from the access control function upon successful verification of the cryptographic proof of use, and provide the decryption key to a decoder for decrypting the encrypted second media content element.

10. A non-transitory computer readable medium, comprising program instructions for causing an apparatus to perform at least the following:
- generating a signed digital resource transaction associated with an encrypted second media content element,
- providing the signed digital resource transaction to an access control function,
- receiving an input from the access control function for proceeding with decoding of a first media content element after verification of the signed digital resource transaction, and
- causing decoding of the first media content element in response to the input,
- detecting a decoded first media content element in response to the decoding,
- generating a cryptographic proof of use associated with the first media content element on the basis of the decoded first media element, and
- providing the cryptographic proof of use for the access control function for controlling access to the encrypted second media content element associated with the first media content element on the basis of verification of the cryptographic proof of use and an expected first cryptographic proof of use associated with the first media content element, and
- generate the cryptographic proof of use on the basis of hashes of video frames of the decoded first media content element.

* * * * *